United States Patent [19]
Perry et al.

[11] Patent Number: 5,337,776
[45] Date of Patent: Aug. 16, 1994

[54] PIPELINE

[76] Inventors: Michael R. Perry, 32 Woodland Road, Kenilworth, Warwickshire CV8 2FL; Katharine A. Wykes, 50 Ettington Close, Wellesbourne, Warwickshire CV35 9RJ, both of England

[21] Appl. No.: 66,532
[22] Filed: May 24, 1993
[51] Int. Cl.⁵ .............................. F16K 17/16
[52] U.S. Cl. ........................ 137/68.1; 137/1; 138/89
[58] Field of Search ................ 137/1, 68.1; 138/89

[56] References Cited

U.S. PATENT DOCUMENTS

| | | | |
|---|---|---|---|
| 1,655,433 | 1/1928 | Morriss | 137/68.1 X |
| 1,765,883 | 6/1930 | Ruschke | 137/68.1 X |
| 2,552,110 | 5/1951 | Otis et al. | |
| 4,246,221 | 1/1981 | McCorsley, III | |

FOREIGN PATENT DOCUMENTS

| | | |
|---|---|---|
| 459264 | 5/1928 | Fed. Rep. of Germany . |
| 3630057 | 3/1988 | Fed. Rep. of Germany . |
| 2185287 | 6/1987 | United Kingdom . |

*Primary Examiner*—John C. Fox
*Attorney, Agent, or Firm*—Davis Hoxie Faithfull & Hapgood

[57] ABSTRACT

A safety system for relieving over pressure in a pipeline carrying a congealable material, in which the pipeline is provided with a bursting disc located in a spur of the pipeline, the disc being mounted in a holder so that the surface of the disc forms part of the wall of the pipeline so that material passing down the pipeline washes the surface of the disc and keeps its clean.

11 Claims, 1 Drawing Sheet

PIPELINE

BACKGROUND OF THE INVENTION

1. Field of the Invention

This invention relates to pipelines and has particular reference to pipelines for transporting congealable fluids.

The term "congealable fluid" as used herein means a fluid which, as a result of changes in temperature, pressure, flow, or degradation can result in the formation of a substantially solid, substantially unmoveable product.

The invention has particular application to congealable fluids susceptible to exothermic reactions, such as congealable pastes or slurries. The invention has further particular application to pipelines for the transport of mixtures of cellulose, a tertiary amine n-oxide and a non-solvent for cellulose, such as water.

2. Brief Description of the Prior Art

It is well known to incorporate into pressure vessels a safety pressure relief device. A common form of safety pressure relief device is a bursting disc. A bursting disc essentially comprises a membrane which is relieved—either by bursting open or being blown out of its holder, or both, under the action of a pressure greater than the normal operating pressure for the pressure vessel but below the pressure at which the vessel itself will rupture.

Bursting discs are conventionally mounted in small pipe spurs located off of a pressure vessel or are formed as part of the wall(s) of the pressure vessel.

It has now been discovered that there may be particular problems with pipelines for transporting a congealable fluid where an excess pressure may arise in the transport pipeline itself. The present invention is concerned with the provision of an over-pressure device for a pipeline for transporting a congealable fluid where there is a possibility that an excess pressure may arise within the congealable fluid. The excess pressure may arise within the pipeline itself or may be the result of a rise in pressure external to the pipeline.

SUMMARY OF THE INVENTION

By the present invention there is provided a pipeline for transporting a congealable fluid, the pipeline incorporating an over-pressure device, the device comprising a disc displaceable under the action of pressure to form a vent for the pipeline and being mounted in the pipeline and being so positioned that part at least of the surface of the disc is washed by the fluid passing through the pipeline.

The disc is preferably a bursting disc and may be mounted in a holder inserted into a branch off the pipeline, so that the surface of the disc is in part substantially flush with the inside of the pipeline. The branch may have a flange, and the holder may have a cooperating flange, the two flanges being secured together, preferably being bolted together.

The branch may further extend into a contained receptacle area downstream of the flange into which product may be relieved in the event of bursting of the bursting disc.

The congealable fluid may be susceptible to exothermic reactions, and may be a mixture of cellulose and a tertiary amine n-oxide, optionally with water. The tertiary amine n-oxide may be an n-morpholine n-oxide.

The bursting disc may be of stainless steel and the bursting disc may be welded to the bottom of the holder. The bursting disc may be electron beam welded to the bottom of the holder.

By "washing" as used herein is meant that the surface, or a part of the surface, of the disc is kept substantially free of congealed material in the event of conditions within the pipe permitting partial congealing of the congealeable fluid. Essentially the bursting disc is so mounted that there is no significant "dead space" between the disc and the flow of congealable fluid within the pipeline, so that congealed material is not in a position to build up and form a plug which would prevent operation of the disc in the event of an over-pressure within the pipeline. If congealing does occur, degradation of the congealed product may occur, and if this degraded material is carried into the main dope stream it can either block up the filters or will reduce the quality of the final product, and may prevent the relief of pressure through the bursting disc due to the presence of the degraded product.

BRIEF DESCRIPTION OF THE DRAWINGS

By way of example, an embodiment of the present invention will now be described with reference to the accompanying drawing, of which.

DESCRIPTION OF THE PREFERRED EMBODIMENT

Figure 1:
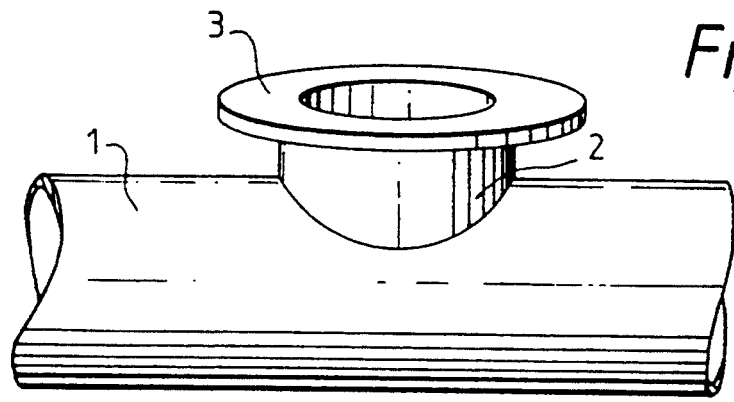
FIG. 1 is a schematic view of a pipeline including a branch and flange.

FIG. 1 illustrates a pipe 1 through which is transported a congealable liquid. In particular the pipe 1 may be used to transport a solution of cellulose in a tertiary amine oxide such as n-methyl morpholine n-oxide. The solution may further include a small quantity of water. The solution may be manufactured by the process described in U.S. Pat. No. 4,246,221, the contents of which are incorporated herein by way of reference.

The solution passing through the pipe 1 will congeal in the event that the solution cools sufficiently (it is normally pumped through the pipe at a temperature in the range 100 to 120° C.). The solution, being an organic solution, may also decompose to form a hard compound which can adhere to the surface of the pipe.

In order that there may be a protection against sudden increases in pressure in the pipe, for example, by way of an exothermic reaction within the solution, there is provided an over-pressure device in the pipe.

Over-pressure devices are, of course, well known. For example the pipe 1 may be provided with a branch 2 having an integral flange 3. An over-pressure device may be attached to the flange 3.

Figure 2:
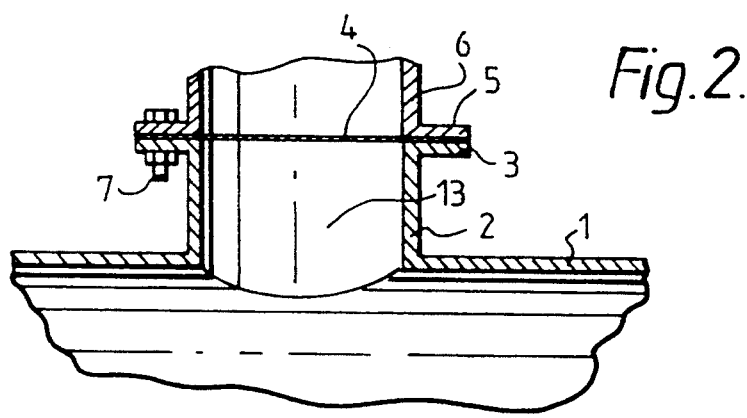
FIG. 2 is a partial cross-section of FIG. 1 incorporating a disc and not being in accordance with the invention.
Figure 3:
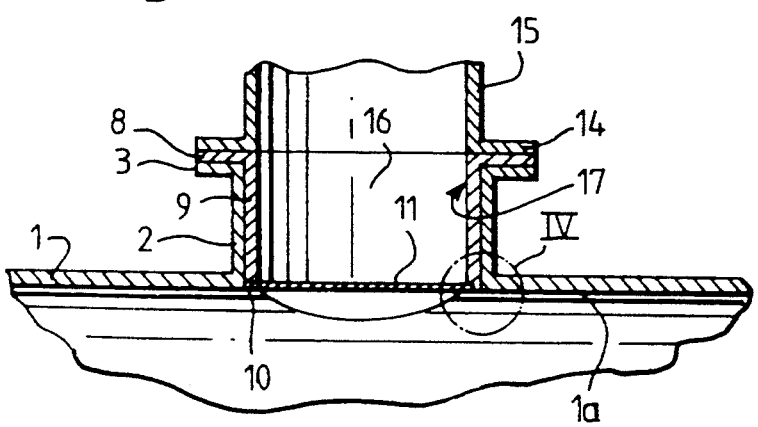
FIG. 3 is a cross-section similar to FIG. 2, but in accordance with the invention.
Figure 4:
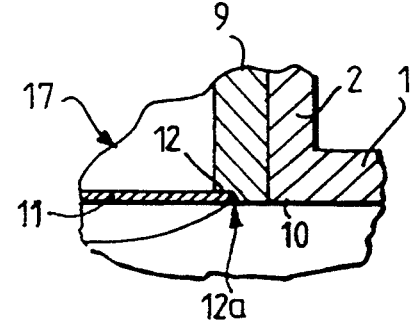
FIG. 4 is an enlarged view of the portion within the circle IV of FIG. 3.

Referring to FIG. 2, this shows a conventional over-pressure device arrangement in which a bursting disc 4 in the form of a flat plated is clamped between the flange 3 and the flange 5 on a dump tube 6 by means of bolts 7. It has been discovered, however, that such an arrangement is unreliable for use with congealing or congealable materials particularly those materials subject to very rapid increases in pressure as a result of an exothermic reaction within the materials. It has been found that the arrangement illustrated in FIG. 2, although perfectly satisfactory for gases or liquids, may not react satisfactorily when used with congealable liquids. It has been found that with the arrangement illustrated in FIG. 2 there can be a failure of the bursting disc to open in the event of an over-pressure within the pipe 1. The solution to this problem is provided by the arrangement illustrated in FIGS. 3 and 4.

In FIG. 3 the pipe 1 is again provided with a branch 2 and a flange 3. The bursting disc is, however, provided on a top hat shaped structure 17 bolted to the flange 3. The structure 17 illustrated in FIGS. 3 and 4 comprises a flanged portion B integral with a tubular member 9 welded to the bottom end 10 of which is a bursting disc 11 of stainless steel. Further details of the bottom of the tube 9 and the bursting disc 11 can be seen with reference to FIG. 4. It can be seen that the end 10 has a rebated portion 12 into which the bursting disc 11 is fitted prior to electron beam welding from the underside as shown in the drawing. The disc may be flat, or convex or concave as required.

The bursting disc 11 if flat will, therefore, be effectively continuous with the inside portion 13 of the tube 1 only along a line. However, because the bursting disc 11 is along that line in contact with material flowing through the pipe 1, the material washes the surface of the bursting disc 11 and keeps it clear. With the arrangement illustrated in FIG. 2 material can build up in the dead space 13 and can either congeal or can decompose and form a solid adherent block within the dead space. In the event of over-pressure within the pipe 1 this block can prevent bursting of the disc 4. By comparison with the arrangement illustrated in FIGS. 3 and 4, the surface of the disc 11 is always kept clear at least in part, and, therefore, the disc is always exposed to the true pressure of the material within the pipe 1 and is thus ready to burst in the event of the appearance of the protected-against over-pressure within the pipe 1.

The flange 8 of the top hat structure 17 may be clamped between the flange 3 and a further flange 14 attached to a dump tube 15. The dump tube 15 may be heated to 100° C. and connected to a suitable receptacle, utilising expansion bellows if required in the tube, to contain product released in the event of over-pressure within the pipe 1 and the bursting of the disc 11. If required the space 16 may be filled with nitrogen. A bursting disc detector may be mounted down-stream of the disc.

It has further been discovered that provided the temperature of the congealable solution of cellulose in an aqueous tertiary amine oxide—typically n-methyl morpholine n-oxide—is kept above 80° C., the pressure relief devices can be located at considerable distances apart along the length of the pipeline.

It is believed that this is because the result of an exothermic reaction within the pipeline is to give an impulse to the contents of the pipeline. As the material is thixotropic, the impulse tends to reduce the viscosity of the material and permit gases from the exotherm to pass down the thusly thinned material. The action of movement within the material increases the reduction in viscosity thereby setting up a bore within the material within the pipeline. Unexpectedly it has been discovered, therefore, that it is possible to mount the devices as far apart as 27 metres and thus as far away from a potential exotherm as 13.5 metres and still obtain venting of the product. It may be possible to mount the devices even further apart and thus even further away from a potential exotherm, such as for example 30 metres. Typically it would be preferred to provide a venting unit close to a potential source of an exotherm but because of the ability of the material to form cores within itself under exothermic conditions, it is possible to vent over large distances.

We claim:

1. In a method of transporting a congealable solution of cellulose in an aqueous tertiary amine oxide, through a pipeline, the improvement which comprises maintaining said solution at a temperature in excess of 80° C. and incorporating in said pipeline an over pressure device, the device comprising a surface displaceable under the action of pressure to form a vent for the pipeline, the surface being mounted in the pipeline so that part at least of the surface is washed by the solution passing through the pipeline.

2. In a method as claimed in claim 1 the improvement which comprises the provision of a plurality of said over pressure devices separated by distance in the range half metre to thirty metres.

3. In a method as claimed in claim 1 the improvement which comprises forming said surface as a disc.

4. In a method as claimed in claim 3 the improvement which comprises forming said disc as a bursting disc mounted in a holder inserted into a branch of said pipeline, wherein the surface of said disc is in part substantially flush with the inside of said pipeline.

5. In a method as claimed in claim 4 the improvement which comprises forming said branch with a flange, the holder having a co-operating flange, the two flanges being bolted together.

6. In a method as claimed in claim 5; the improvement which comprises providing the disc of stainless steel.

7. In a method as claimed in claim 6 the improvement which comprises electron beam welding said disc into said holder.

8. A pipeline for the transport of a solution of cellulose in an aqueous organic solvent wherein the pipeline is provided with a plurality of over pressure devices, some at least of the devices comprises a disc displaceable under the action of pressure to form a vent for the pipeline, the disc being mounted in the pipeline and so positioned that a part at least of the surface of the disc is washed by the solution passing through the pipeline.

9. A pipeline as claimed in claim 8 in which the disc is a bursting disc mounted in a holder inserted into a branch of the pipeline so that the surface of the disc is in part substantially flush with the inside of the pipeline.

10. A pipeline as claimed in claim 9 in which the branch further extends into a contained receptacle downstream of the flange into which product may be relieved in the event of bursting of the bursting disc.

11. A pipeline as claimed in claim 10 in which the extension of the branch is maintained at a temperature in excess of 80° C.

* * * * *